Dec. 8, 1942.  F. DOVERSPIKE  2,304,555
TRAP
Filed May 30, 1942
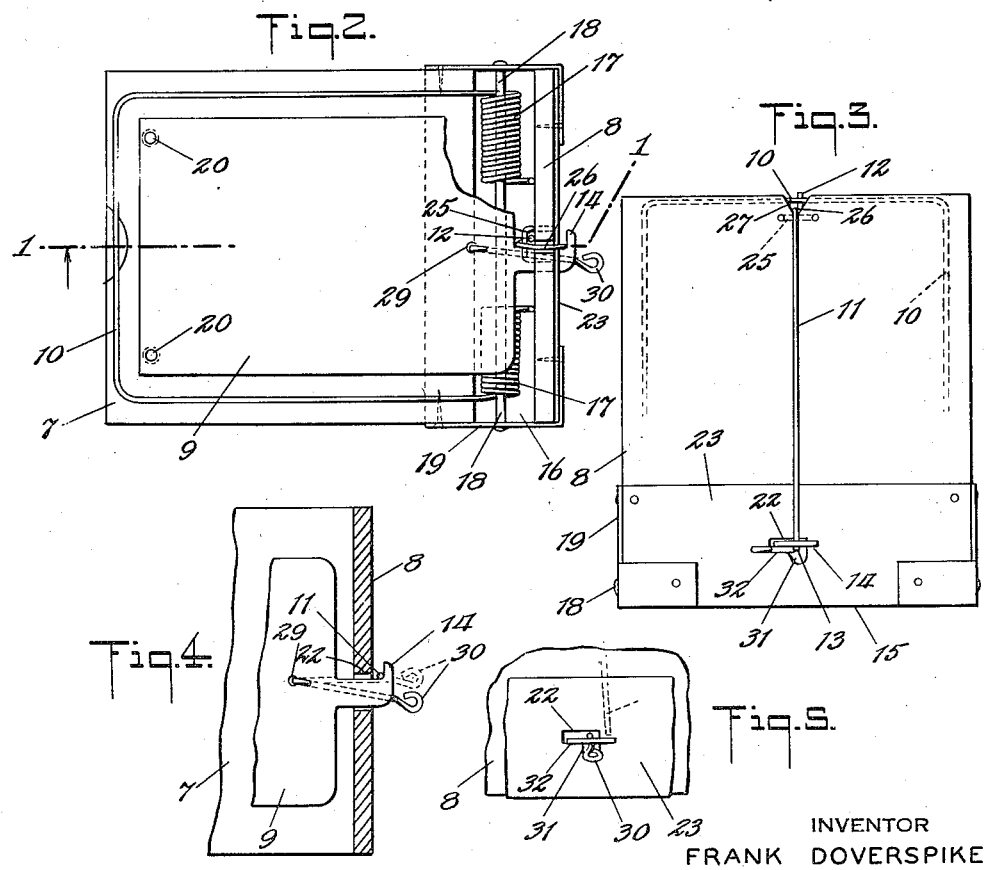
INVENTOR
FRANK DOVERSPIKE
BY
ATTORNEY Patented Dec. 8, 1942

2,304,555

UNITED STATES PATENT OFFICE 2,304,555

TRAP

Frank Doverspike, New York, N. Y.

Application May 30, 1942, Serial No. 445,409

6 Claims. (Cl. 43—81)

The invention herein disclosed relates to traps for animals, such as rats and mice.

Special objects of the invention are to provide a powerful effective trap of the spring jaw type, which will be sensitive to release, and from contact at any point over a widely extended area; which will be safe to set and handle and which will be of simple, practical, rugged and inexpensive construction.

The foregoing and other desirable objects are attained by the novel features of construction, combinations and relations of parts hereinafter described, illustrated in the accompanying drawing and broadly covered in the claims.

While in the drawing there is shown a present preferred embodiment, it is realized that structural changes may be made all within the true intent and broad scope of the invention. The present illustration is to be interpreted accordingly.

Fig. 1 is a central vertical sectional view of the trap as on substantially the plane of line 1—1 of Fig. 2.

Fig. 2 is a top plan view, with a corner of the trigger platform broken away to show the coil portion of the spring jaw seated below the same.

Fig. 3 is a back view of the device.

Fig. 4 is a broken, part sectional detail of the latch, trigger and safety catch elements.

Fig. 5 is a broken, rear elevation showing the safety catch shifted and the trap sprung.

In the embodiment illustrated, the trap consists in the main of a base 7, an upright wall 8, at one end of the base, a platform, pan or plate 9, pivoted on the base at the end opposite the upright wall, a spring jaw 10, and a lever 11, having a detent portion 12, for holding the spring jaw, and a catch portion 13, adapted to be held by the trigger extension 14, of the platform.

The base and upright may be of wood and these parts are shown connected in rectangular relation by a bracket 15, of sheet material secured across the bottom and the side edges of the base and extending from the end of said base up the back of the upright 8, to brace and secure the latter in upstanding relation spaced back from the end of the base.

Within the transversely extending space or channel 16, thus provided at the end of the base, the coil portions 17, of the spring jaw are located, caught and held by the rod 18, extending through such coils and riveted or otherwise secured at its ends in the side extensions 19, of bracket 15.

The pan or platform 9, is shown of flat sheet material and, in the illustration, of substantially or nearly the full size or expanse of the base. The pivotal connection with the base is shown as consisting simply of two pins or brads 20, extending loosely through corner portions of the pan into the base and washers 21, to loosely support this end of the pan raised slightly above the base.

The trigger 14, on the opposite end of the pan is shown in the form of a hook extension projecting out through an opening 22, in the upright wall and the back portion 23, of the supporting bracket.

The detent lever is shown made up of a length of wire bent near the top into a loop 24, which is engaged about a hinge staple 25, driven into the front of the upright board and providing the upwardly projecting detent portion 12, which can be caught about the bail portion of the spring jaw. From the hinge loop 24, a horizontally extending portion 26, of the wire projects rearwardly through a notch 27, in the upper edge of the board and from this horizontal portion, the downwardly bent part 13, extends down over the back of the board to provide at the lower end the catch engageable by the trigger hook.

In the "set" position illustrated in Fig. 1, the platform is supported only by a light frictional engagement of the hook 14, over the outwardly tensioned lower end of the catch 13, so that the lightest pressure or weight applied to the platform at any point in its extensive area will be sufficient to slip the trigger down off the lower end of the catch and thus spring the trap.

To enable the trap to be handled safely, there is provided in the illustration, a small wire lever 28, disposed beneath and pivotally connected with the pan at 29, said lever projecting out through the slot 22, and having there a suitable handle 30, by which it may be shifted from a non-interfering position in line with the notch 31, Fig. 5, over into a safety stop position, Fig. 3, above the supporting shoulder 32. In the latter position, it will be seen that this safety catch prevents downward movement sufficient to release the detent lever. Thus with the safety catch swung over to one side as shown in Fig. 3, the trap can be set and then handled with absolute safety, for instance, for placing it near a selected wall or runway. This catch furthermore, is located at the back of the upright wall, where it can be released without approaching the front of the trap.

Bait may be spread over or placed upon the pan or the device be used as a baitless trap. The mechanical parts of the trap are largely concealed, leaving the front and base portions plain and unlikely to cause alarm. The transverse channel or space at the end of the base provides for location of the spring coil or coils below the surface of the base and the extension of the trigger platform over this channel more or less hides such mechanism and provides additional trapping surface. The traps can be inexpensively produced, mostly of wood or other readily available materials. While for some purposes it may be desirable to make the trigger platform of metal, it is contemplated that this may be a light wooden panel.

What is claimed is:

1. A trap comprising a base, an upright wall at one end of said base, a platform of substantially the area of said base, said platform overlying and pivotally supported on said base at the end opposite said upright wall, a spring jaw fulcrumed on said base at the foot of said upright wall and having a bail portion adapted to be raised to the top of said wall, a lever pivoted on said wall and having an upwardly extending detent portion engageable with said bail and a dependent catch portion near the foot of said wall, said wall having an opening therethrough and said platform having a trigger extension projecting through said wall opening and slidingly engageable over the lower end of said catch portion of the detent lever, the inner portion of said pivoted platform having downward movement sufficient to slide said trigger extension off the lower end of said catch portion of the detent lever and a safety catch pivoted to swing from a non-supporting to a supporting position beneath said pivoted platform.

2. A trap comprising a base, an upright wall at one end of said base, a platform of substantially the area of said base, said platform overlying and pivotally supported on said base at the end opposite said upright wall, a spring jaw fulcrumed on said base at the foot of said upright wall and having a bail portion adapted to be raised to the top of said wall, a lever pivoted on the front of said wall having an upwardly extending detent portion engageable with said bail and a dependent catch portion near the foot of said wall, said wall having an opening therethrough and said platform having a trigger extension projecting through said wall opening and slidingly engageable over the lower end of said catch portion of the detent lever, the inner portion of said pivoted platform having downward movement sufficient to slide said trigger extension off the lower end of said catch portion of the detent lever, said wall having a supporting shoulder at the lower edge of said opening and a notch at one side of said supporting shoulder, and a safety catch movable from a position in line with said notch into a supported position above said shoulder and in supporting relation to said trigger extension of the platform.

3. A trap comprising a base, an upright wall at one end of said base, a platform of substantially the area of said base, said platform overlying and pivotally supported on said base at the end opposite said upright wall, a spring jaw fulcrumed on said base at the foot of said upright wall and having a bail portion adapted to be raised to the top of said wall, a lever pivoted on the front of said wall having an upwardly extending detent portion engageable with said bail and a dependent catch portion near the foot of said wall, said wall having an opening therethrough and said platform having a trigger extension projecting through said wall opening and slidingly engageable over the lower end of said catch portion of the detent lever, the inner portion of said pivoted platform having downward movement sufficient to slide said trigger extension off the lower end of said catch portion of the detent lever, said wall having a supporting shoulder at the lower edge of said opening and a notch at one side of said supporting shoulder, and a safety catch movable from a position in line with said notch into a supported position above said shoulder and in supporting relation to said trigger extension of the platform, said safety catch comprising a lever pivoted on the underside of said platform and having a handle portion projecting out through the back of said upright wall.

4. A trap comprising a base, an upright wall at one end of said base, a platform of substantially the area of said base, said platform overlying and pivotally supported on said base at the end opposite said upright wall, a spring jaw fulcrumed on said base at the foot of said upright wall and having a bail portion adapted to be raised to the top of said wall, a lever pivoted on the front of said wall having an upwardly extending detent portion engageable with said bail and a dependent catch portion near the foot of said wall, said wall having an opening therethrough and said platform having a trigger extension projecting through said wall opening and slidingly engageable over the lower end of said catch portion of the detent lever, the inner portion of said pivoted platform having downward movement sufficient to slide said trigger extension off the lower end of said catch portion of the detent lever, a bracket supporting said upright wall spaced from the back edge of said base and said spring jaw having a coiled spring portion seated in the space between the back edge of said base and said upright wall.

5. A trap comprising a base, an upright connected with one end portion of said base, with a transverse channel at the end of said base and at the foot of said upright, said upright having an opening therethrough above the level of the base, a trigger platform overlying and hinged on the base at the end opposite said upright, said platform projecting over said transverse channel and having a trigger extension projecting through said opening in the upright, a spring jaw having a coil portion disposed in said transverse channel beneath said projecting portion of the trigger platform and a bail portion adapted to be raised to the top of the upright, a detent for said bail pivotally mounted on said upright and extending down the back of the wall into position for engagement by said trigger extension.

6. A trap comprising a base, an upright connected with one end portion of said base, with a transverse channel at the end of said base and at the foot of said upright, said upright having an opening therethrough above the level of the base, a trigger platform overlying and hinged on the base at the end opposite said upright, said platform projecting over said transverse channel and having a trigger extension projecting through said opening in the upright, a spring jaw having a coil portion disposed in said transverse channel beneath said projecting portion of the trigger platform and a bail portion adapted to be raised to the top of the upright, a detent for said bail pivotally mounted on said upright and extending down the back of the wall into position for engagement by said trigger extension and a safety catch pivoted at the underside of said platform and extending over said transverse channel and through said opening in said upright into position for supporting the trigger extension of said platform.

FRANK DOVERSPIKE.